July 11, 1950
Q. C. JOHNSON
2,514,495
GUN BLAST SEAL
Filed March 5, 1947
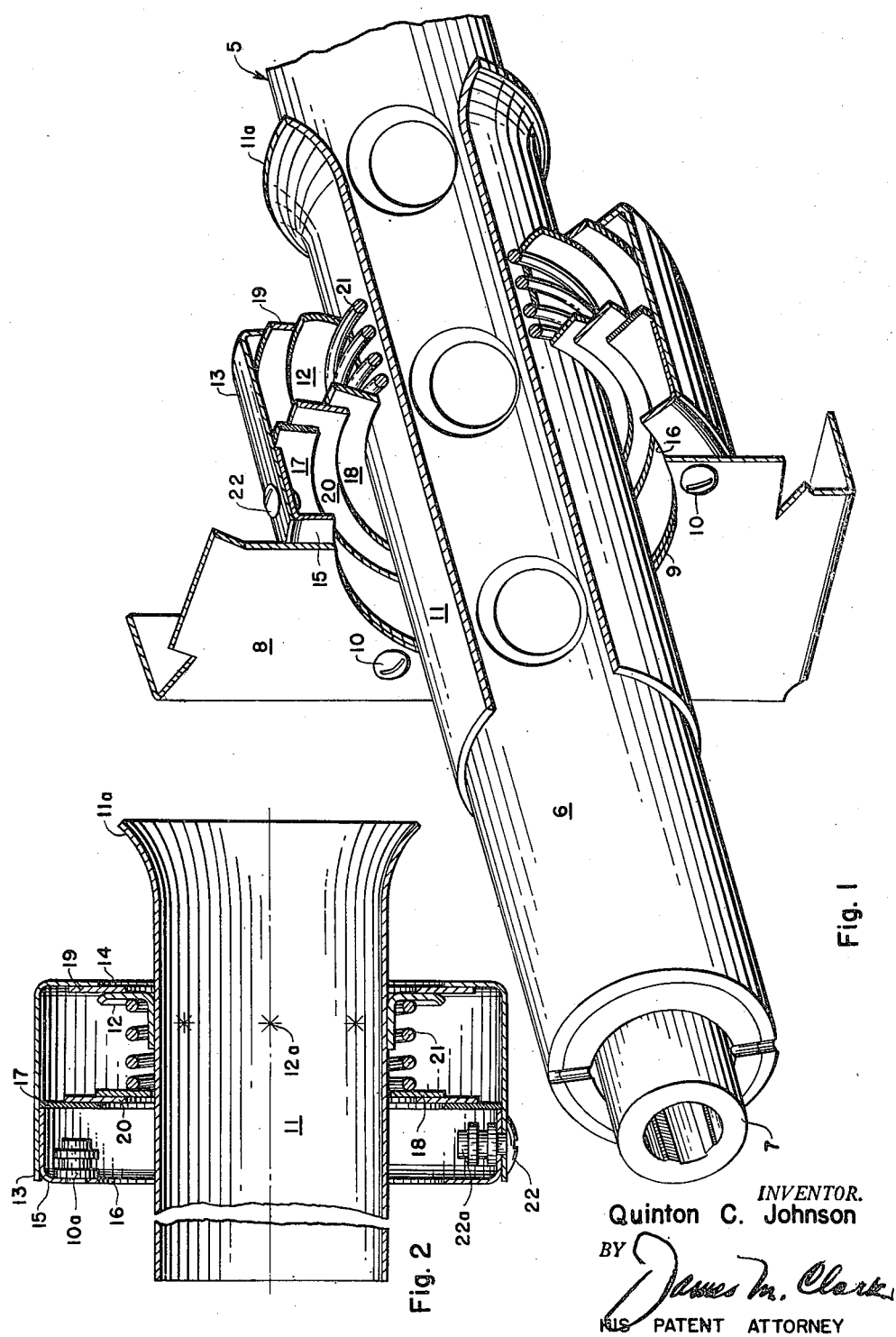
INVENTOR.
Quinton C. Johnson
BY
HIS PATENT ATTORNEY

Patented July 11, 1950

2,514,495

UNITED STATES PATENT OFFICE 2,514,495

GUN BLAST SEAL

Quinton C. Johnson, Gardena, Calif., assignor to North American Aviation, Inc.

Application March 5, 1947, Serial No. 732,599

6 Claims. (Cl. 89—37.5)

The present invention relates to fixed gun installations and more particularly to improved blast seals for such gun installations in aircraft and like vehicles.

This invention relates to the mounting of fixed machine guns, light cannon or the like as installed in the wings, nacelles or other portions of aircraft and other vehicles. The term "fixed gun" is used herein to distinguish from "flexible" guns which are mounted in such manner that they are capable of being aimed while fired. The guns to which the present invention is more particularly applicable are generally fixedly attached to the aircraft, or other vehicle, and are usually aimed in flight by training the aircraft, or suitable sighting means thereon, upon the target. The present improved sealing means is, however, flexible to the extent that it can accommodate limited adjustments of the gun in its mounting with respect to the fixed structure of the airplane, which adjustments are usually made while the aircraft is on the ground.

In such fixed gun installations in aircraft, it is important that the interior of the wing or other body is protected or shielded as much as possible both from the blast effects of the firing of the guns, as well as from the ramming effect of the high pressure air entering the wing or body around the barrel of the gun due to the forward flying speed of the aircraft. The provision of a satisfactory sealing means is further made necessary due to the corrosiveness of the gases expelled from the gun muzzle during firing, and particularly as protection against blast effects resulting from gun installations wherein the muzzle of the gun is submerged within the wing or body. In such instances where a gun muzzle is located behind or approximately even with the leading edge of the wing, pressures may be built up within the wing interior from these blast effects. Under these circumstances the forward speed of the airplane might be materially affected by these pressures building up within the wing and leaking out at the wing skin joints. This outward leakage results in a serious disruption of the desired smooth flow over the airfoil section inasmuch as the air leaking through the skin joints is normal or perpendicular to the airflow, thereby resulting in a material decrease in the aerodynamic efficiency of the wing.

A number of efforts have been made in the past to provide suitable sealing devices for preventing the leakage of such air and gun blast pressures past the blast tubes or into the wing, or other body portion, but these devices have usually proven objectionable due either to their excessive weight, their difficulty of installation and adjustment, or to their lack of flexibility and difficulty of maintenance. The sealing device of the present invention comprises essentially a pair of nesting cup-shaped members housing a plurality of spring-pressed overlapping annular rings or washers cooperating with a tubular shield which closely fits the gun barrel or jacket. It is relatively light in weight, provides maximum adjustment within a minimum of housing space and can be installed in a relatively simple manner. The device is simple to construct and assemble, can be produced economically and the spring arrangement compensates for any misalignment when the gun is installed.

It is accordingly a major object of the present invention to provide means for sealing or shielding in a relatively airtight manner the interior of wings, nacelles and other body portions from the effect of firing an aircraft-mounted gun as well as from the effects of rammed air due to the forward flight of the aircraft. It is a further object to provide a low cost, simple and readily adjusted universal gun barrel opening and blast seal. A further object lies in the provision of such a seal which readily accommodates the gun blast tube and is adapted to be installed in existing installations without the necessity of changing the present gun mounts. A still further purpose resides in providing a readily adjusted sealing device which, by the utilization of double slides provides a maximum adjustment within a minimum of housing space.

It is a further object of this invention to provide a gun blast seal which readily accommodates aiming adjustments of the gun and changes in relationship of the gun axis with respect to the fixed structure. A still further object is to provide a seal which need not be attached to the gun and thereby does not limit the gun to one position. A corollary purpose is the provision of such a sealing unit incorporating a sleeve which permits the installation of different guns in varying positions without the necessity of the sealing units being removed with the gun. A further object of the invention is the provision of a gun blast seal unit which includes a spring arrangement for automatically compensating for any misalignment when the gun is installed; and a unit in which the installation and maintenance is simplified by simple attachment of the unit to the supporting structure.

Other objects of the present invention will become apparent to those skilled in the art after reading the present description taken together with the accompanying drawings forming a part hereof in which:

Fig. 1 is a perspective view of a preferred form of the improved sealing unit applied to the jacket of a machine gun; and Fig. 2 is a cross-sectional view of the sealing unit shown in Fig. 1.

The numeral 5 designates the barrel portion of a machine gun about which is provided a cooling jacket 6, the machine gun barrel having its muzzle 7 projecting slightly forward of the cooling jacket. The fixed supporting structure of the aircraft, or like vehicle, is designated by the numeral 8, which may be the leading edge spar of a wing or other fixed structural portion of a wing, nacelle or other body portion. A circular opening 9 is provided in the supporting structure 8 having a substantially greater diameter than that of the cooling jacket 6. In Fig. 1, the improved seal unit has been shown installed on the rear, or breech, side of the supporting structure 8, being attached from the front thereof by means of the three screws 10. The device is such, however, that it may be installed on the opposite, or front side, of the supporting wall in which position it will be equally effective as a blast seal.

The seal unit is built around an inner tubular sleeve 11 which is of a suitable internal diameter to closely engage the jacket 6 of the gun barrel. The sleeve 11 is provided with an outwardly flared end at 11a on the rear side of the assembly for ease of installation of the gun. The sleeve 11 is not fastened to the gun and accordingly the gun is readily removed from within the sleeve without the necessity of the removal of any attachment, and another gun of the same size may be readily inserted into the sleeve, which remains attached to the fixed structure 8. The sleeve has a retaining flange 12 spotwelded or otherwise fastened to the outer surface thereof, as indicated at 12a in Fig. 2.

The sleeve passes through a housing which comprises the cup-shaped cover member 13, apertured as at 14, and which has a second somewhat shallower cup-shaped member 15 inserted in an opposed relationship into its open end. The cup-shaped members 13 and 15 are nested or telescoped within each other with their transverse or inwardly turned flange portions at opposite ends in order that they form a housing of a length substantially equivalent to the axial dimension of the larger cup-shaped member 13. The member 15 is also apertured at 16, the opening being substantially the same diameter as that of the opening 9 in the supporting structure 8, to which it is attached such that these two openings substantially coincide.

Within the housing, which is formed by the cup-shaped members 13 and 15, there are disposed a plate member 17 having an outside diameter corresponding with the inside diameter of the cover member 13 and a plate member 18 having an inside diameter corresponding to the outside diameter of the central sleeve 11. On being assembled, annular washers or auxiliary sliding shields 19 and 20 are disposed between the elements 12 and 13, and 17 and 18, respectively. The washers 19 and 20 have enlarged central openings and outside diameters sufficiently smaller than the inside diameter of the housing to permit of some misalignment without interference with the housing member. A compression coil spring 21 is disposed between the retaining flange 12 and the plate member 18 being slightly compressed to exert an outward pressure in the axial direction to frictionally maintain contact of the transverse surfaces of the sealing ring elements 17, 18 and 20 forward of the spring, and similar contact between the elements 12, 13 and 19 aft of the spring.

The entire unit may be assembled by initially placing the shield disc 19 within the larger cup-shaped member 13 and inserting the sleeve 11 with its attached flange 12 into the cup-shaped member 13, together with the compression spring 21. The elements 18, 20 and 17 are then placed in the housing portion 13 against the spring 21, in the order named, and the smaller cup-shaped member 15 is then nested or telescoped into the larger cup member slightly compressing the spring 11 as they are brought into proper co-axial relationship. They are then secured by the screws 22 engaging the anchor nuts 22a which are attached to the inside of the smaller cup member 15. The latter member also has attached to its inwardly directed flange or abutment the anchor nuts 10a by means of which the entire seal unit is attached to the fixed structure 8 as by the aforementioned screws 10.

An airtight rear seal is formed by the end portion or transverse abutment of the cover 13, the auxiliary sliding plate 19 and the sleeve flange 12. A second or front seal is formed by the annular disc or washer 18, the auxiliary sliding disc 20 and the disc member 17. The compression spring 21 provides sufficient force to maintain the several pieces in their proper floating relationship in any position into which they may be adjusted. As indicated above, the assembly may be readily reversed as dictated by the particular installation, and in either case the flared end 11a of the shield 11 is pointed toward the breech end of the gun or to that side from which the gun is inserted to project through or pierce the opening in the wall structure.

It will accordingly be noted that a very effective and efficient unit is provided which is readily installed, or removed, and which permits rapid removal and installation of the gun without the necessity of removing any attachments. The seal can be mounted in either direction, or in any position on the gun jacket, or even slightly forward of the gun. It is not necessary to maintain a critical or precise relationship with the front supporting mount as is the case with most prior ball and socket seals. The unit is relatively light and compact and is completely self-contained. It permits direct side travel due to the double series of sliding discs or washers which allow maximum travel within a minimum space while maintaining an airtight seal. The unit further can be made up of stamped or formed parts which do not require any machine work and permit a relatively low cost of fabrication.

Other forms and modifications of the present device, both with respect to its general arrangement and the details of its several parts, which may occur to those skilled in the art after reading the present description, are each intended to fall within the scope and spirit of this invention as more particularly defined in the appended claims.

I claim:

1. In an aircraft gun installation, the combination with a wall structure having an opening therein and a gun mounted such that its barrel portion projects through said wall opening, of sealing means for preventing the flow of gases and air pressure through said opening around said gun barrel comprising a tubular housing member having an inwardly turned flange attached to said wall structure around the opening therein, a tubular sleeve member slidingly engageable with the barrel of said gun, an outwardly extending flange carried by said sleeve member, a series of annular sealing discs of progressively increasing diameters extending between said sleeve member and the flange of said tubular housing member, and resilient means interposed between said sealing discs and said sleeve member flange arranged to maintain said discs in airtight contact for the prevention of said flow around said sleeve member and through said wall structure opening.

2. In an aircraft gun installation, a wall structure having an opening therein, a gun mounted such that its barrel portion projects through said wall opening, and sealing means for preventing the flow of gases and air pressure through said opening around said gun barrel comprising a tubular housing member having an inwardly turned flange attached to said wall structure around the opening therein, a tubular sleeve member slidingly engageable with the barrel of said gun, an outwardly extending flange carried by said sleeve member, a series of annular sealing discs of progressively increasing diameters extending between said sleeve member and said tubular flanged member, resilient means interposed between said sealing discs and said sleeve member flange arranged to maintain said discs in airtight contact for the prevention of said flow around said sleeve member and through said wall structure opening, and a flanged housing member telescopically engaging said tubular flanged member having its flange in a sealed relationship with the flange of said sleeve member.

3. A gun blast seal for an opening in a wall structure including a gun barrel disposed for firing through said opening, a housing formed by two telescoped cup-shaped members having opposed end walls, the said end walls of said members forming transverse flanges apertured for said gun barrel, the flange of one of said members attached to said wall structure, a sleeve element having a retaining flange carried thereon arranged to slidingly fit over said gun barrel and through said transverse flanges, a plurality of annular discs of progressively different diameters transversely disposed in overlapping relationship with the said transverse flange of one of said members, one of said discs arranged to fit closely about said sleeve element, a shield disc interposed between the transverse flange of the other said member and the retaining flange of the said sleeve element, and resilient means arranged to frictionally clamp said annular discs in a sealing relationship between said transverse flanges.

4. In a gun blast seal, a gun barrel, a tubular sleeve element fitted about said gun barrel, said sleeve element having a transverse abutment, an apertured tubular housing member attached to adjacent supporting structure spaced from said sleeve element forming an annular space therebetween, and means for sealing the annular space between said tubular sleeve element and said tubular housing member including a series of annular discs of successively greater diameters transversely disposed about the axis of said gun barrel in an overlapping relationship with each other, said tubular housing member having axially spaced flanges arranged for placement on either side of said sleeve element abutment, and resilient means bearing against the abutment carried by said tubular sleeve element and one of said housing member flanges arranged to sealingly compress said overlapping discs against the opposed flange carried by said tubular housing member.

5. In a gun installation, the combination with a wall having an opening therein and a gun mounted such that it projects through said wall opening, of sealing means for preventing the flow of gases through said opening around said gun comprising a tubular housing member having an inwardly turned flange attached to said wall around the opening therein, a tubular sleeve member slidingly engageable with said gun, an outwardly extending flange carried by said sleeve member, a series of annular sealing discs of progressively increasing diameters extending between said sleeve member and the flange of said tubular housing member, means interposed between said sleeve member flange and said tubular housing member for limiting the movement of one with respect to the other, and resilient means disposed between said plurality of sealing discs and said sleeve member arranged to floatingly maintain said discs in a sealed relationship between said gun and the edge of said wall opening.

6. In an aircraft gun installation, a wall having an opening therein, a gun having a barrel mounted such that said barrel projects through said wall opening, and means for sealing the intervening space between said gun barrel and the edge of said wall opening comprising a flanged attachment member having a radially inwardly directed flange, means for attaching said member flange to said wall adjacent the opening therein, a tubular sleeve member engageable with the barrel of said gun, a radially outwardly extending abutment carried by said sleeve member, a series of annular sealing discs of different diameters extending between said sleeve member and said attachment member flange, resilient means interposed between said sealing discs and said sleeve member abutment arranged to apply pressure in the axial direction upon said discs to resiliently maintain a sealed relationship between said sleeve member and said attachment member, a flanged housing member slidingly engageable with said attachment member having a flange contiguous with the abutment of said sleeve member, and seal means interposed between the said contiguous flange of said housing member and said abutment of said sleeve member.

QUINTON C. JOHNSON.

REFERENCES CITED

The following references are of record in the file of this patent:

UNITED STATES PATENTS

| Number | Name | Date |
|---|---|---|
| 889,044 | Roberts et al. | May 26, 1908 |
| 1,473,451 | Walters | Nov. 6, 1923 |
| 2,051,085 | Ilseman | Aug. 18, 1936 |
| 2,076,715 | Fretter | Apr. 13, 1937 |
| 2,111,200 | Amourelle | Mar. 15, 1938 |
| 2,233,918 | Fey | Mar. 4, 1941 |
| 2,267,183 | Williams | Dec. 23, 1941 |
| 2,379,710 | Heineman | July 3, 1945 |

FOREIGN PATENTS

| Number | Country | Date |
|---|---|---|
| 3,661 | Great Britain | Aug. 23, 1881 |
| 192,288 | Great Britain | Feb. 1, 1923 |